United States Patent [19]
Pierce et al.

[11] Patent Number: 5,588,665
[45] Date of Patent: Dec. 31, 1996

[54] TRAILING ARM SUSPENSION WITH LEVER ARM

[75] Inventors: William C. Pierce; Gregory A. Richardson, both of Muskegon, Mich.

[73] Assignee: Nai Neway, Inc., Muskegon, Mich.

[21] Appl. No.: 618,318

[22] Filed: Mar. 19, 1996

Related U.S. Application Data

[63] Continuation of PCT/US94/04228, Apr. 18, 1994.

[51] Int. Cl.⁶ .......................... B62D 61/12; B60G 9/00; B60G 11/56
[52] U.S. Cl. ........................... 280/704; 180/209
[58] Field of Search ...................... 280/704, 711; 180/209

[56] References Cited

U.S. PATENT DOCUMENTS

| | | | |
|---|---|---|---|
| 3,674,249 | 7/1972 | McGee | 262/52 |
| 3,771,812 | 11/1973 | Pierce et al. | 280/704 |
| 4,166,639 | 9/1979 | Taylor | 280/704 |
| 4,293,145 | 10/1981 | Taylor | 280/704 |
| 4,634,141 | 1/1987 | Hagan et al. | 280/704 |
| 5,058,916 | 10/1991 | Hicks | 280/704 |
| 5,058,917 | 10/1991 | Richardson | 280/704 |

FOREIGN PATENT DOCUMENTS

| | | |
|---|---|---|
| 0298929 | 1/1989 | European Pat. Off. . |
| 2543889 | 10/1984 | France . |
| 2579144 | 9/1986 | France . |
| 9307587 | 8/1993 | Germany . |

OTHER PUBLICATIONS

Reimpell, Jörnsen, "Fahrwerktechnik: Stross–und Swingunasdämpfer" 1989, Vogel Verlag, Würzburg pp. 12–17.

*Primary Examiner*—Kenneth R. Rice
*Attorney, Agent, or Firm*—Varnum, Riddering, Schmidt & Howlett LLP

[57] ABSTRACT

A retractable suspension (10) comprises a trailing arm (22) pivotally mounted to a vehicle frame (12), an air spring (30) mounted between the trailing arm and the frame, and a lifting device (32) mounted between the trailing arm and the frame. The lifting device (32) comprises a strut (60) pivotally mounted between the frame (12) and a lever arm (64) that is fixedly mounted to the trailing arm (22). The strut (60) applies a force to the lever arm (64) that imparts a moment to the trailing arm (22) to urge the trailing arm and attached wheels (14) to a retracted position. The force of the air spring (30) can be adjusted to counter the upward movement of the wheels (14).

25 Claims, 7 Drawing Sheets

TRAILING ARM SUSPENSION WITH LEVER ARM

BACKGROUND OF THE INVENTION

This a continuation of International Application No. PCT/US94/01228 filed Apr. 18, 1994.

1. Field of the Invention

This invention relates to vehicle suspensions, and more particularly, to trailing arm suspensions with axle lifts.

2. Description of Related Art

Several types of vehicles, including semi-trailer truck vehicles and the like, have multiple sets of axle/wheel assemblies arranged to adequately support relatively heavy loads. To adjust the load support provided by these assemblies, it is known to employ suspension systems utilizing trailing arms pivotally mounted to the vehicle frame in combination with adjustably pressurized air springs and the like.

When the vehicle is carrying a relatively light load, it is desirable to relieve the load transmitting relationship between the vehicle in one or more of the axle/wheel assemblies, and also to disengage the axle/wheel assembly from ground contact to reduce tire wear. To relieve load support when an air suspension system is employed, air pressure can be reduced. To achieve disengagement of the tires from the road surface, devices commonly referred to as axle lift mechanisms can be employed. Prior lift mechanisms utilized stressed mechanical springs acting directly between a vehicle frame and the axle. When the downward load forces exerted on the axle by the suspension system were relieved, such as through deflation of air springs, lifting forces exerted by the mechanical springs pulled the axle upwardly to a raised position. These lift mechanisms required a sufficient spring stress to support the axle and the various suspension components in a raised position and substantially increased the spring stress when the axle was lowered, which undesirably imparted pre-load forces on the suspension system, reducing the actual maximum vehicle payload carried by the suspension system.

Improved axle lift mechanisms were later developed that overcame the problem of substantial payload reduction. These mechanisms generally comprised a lever arm or cam pivotally mounted to the vehicle frame, with the lever being connected to the axle/wheel assembly by a flexible member such as a strap or a chain and to a compressed or tensioned spring mounted to the axle. The lever arm or cam formed a moment arm with respect to the lever arm pivotal connection to the frame. The moment arm was minimized as the air spring was pressurized to move the axle/wheel assembly to the road engaging position. By minimizing the moment arm when the axle/wheel assemblies are in the road engaging position, the preload forces were minimized. Examples of these types of axle lift mechanisms are found in U.S. Pat. No. 3,771,812, issued Nov. 13, 1973 to Pierce et al. and U.S. Pat. No. 4,634,141, issued Jan. 6, 1987 to Hagan et al.

Axle lift mechanisms can also be used with trailers that are adapted for both highway and railroad use. The wheel gear upon which the trailers ride obviously depends upon whether or not the trailer is to be used in normal highway service or on a railroad track. In the former, conventional ground-engaging rubber tires are required, and in the latter, a rail wheel set, sometimes known as a rail bogie, must be used. Such mechanisms are not only retractable to lift an axle relative to a trailer, but are extendable to lift a trailer relative to the ground to permit attachment of a rail bogie.

Designs for an extendable, retractable suspension are disclosed in U.S. Pat. No. 5,058,916, issued Oct. 22, 1991 to Hicks, and U.S. Pat. No. 5,058,917, issued Oct. 22, 1991 to Richardson. Both patents disclose a retractable trailing arm suspension that is also extendable to lift the vehicle frame to provide for the insertion of a detachable rail bogie to the vehicle frame without the need for an additional lifting mechanism or device. Both structures are relatively complex and have a mechanical locking mechanism that locks the trailing arm of the suspension to the vehicle frame when the suspension is in the raised position. The complexity of these designs renders their manufacturing and operating costs relatively high.

The prior axle lift mechanisms and retractable suspensions satisfactorily performed their function. Unfortunately, their satisfactory performance was at the cost of undesirable complexity and increased maintenance. The prior axle lift mechanisms also required two pivotal connections; one for the trailing arm and one for the lever arm. The second pivotal connection increased the complexity of the lift axle by requiring separate mechanical connections between the spring and lever arm and the lever arm and trailing arm. It is desirable to have a lift mechanism that reduces the complexity and maintenance of the prior lift mechanisms, without sacrificing performance or durability.

SUMMARY OF INVENTION

The invention relates to an axle lift mechanism that can be used to extend and/or retract a vehicle suspension. The axle lift mechanism according to the invention is simpler in construction and requires less maintenance than the prior axle lift mechanisms. The invention fixes a lever arm directly to the trailing arm, thus utilizing the pivotal connection of the trailing arm with the vehicle for leverage. The invention thus eliminates any need for a separate pivotal connection between the lever arm and the vehicle.

A suspension for a vehicle according to the invention comprises a frame to which is pivotally mounted a pair of trailing arms that swing about an axis in generally vertical movement relative to the frame. An axle is mounted to and between the trailing arms and has wheels mounted to each end of the axle. A collapsible spring is disposed between the trailing arms and the frame for cushioning the swinging movement of the trailing arms. A lever arm is fixedly mounted to at least one of the trailing arms in such a manner that it extends upwardly from the trailing arm. A compression spring has one end that is pivotally mounted to the frame and another end that is pivotally mounted to the lever arm above the axis about which the trailing arm pivots. The compression spring exerts a force on the lever arm that tends to urge the trailing arm to a retracted position.

Preferably, the collapsible spring is an air spring of the type commonly used in heavy duty suspensions, and the compression spring is a coil spring. A hydraulic cylinder can be disposed axially within the compression spring and connected to the frame and the lever arm to dampen the swinging movement of the trailing arm.

The lever arm is preferably mounted to the trailing arm between first and second ends of the trailing arm. The lever arm terminates with a terminal end that is positioned above the trailing arm. The compression spring is pivotally mounted between the frame and the terminal end of the lever arm and the collapsible spring is mounted between the trailing arm and the frame near the second end of the trailing arm. The frame typically has opposed frame rails connected by a cross member and the compression spring is pivotally mounted to the cross member.

Preferably, as the trailing arm pivots about the axis toward the retracted position, the compression spring, through the lever, imparts a moment to the trailing arm about the axis. The lever arm is positioned so that a moment arm associated with the moment increases as the wheel is moved toward the retracted position.

In another aspect of the invention, the suspension comprises a frame to which is pivotally mounted a pair of trailing arms so that they pivot about an axis. An axle is mounted to and between the trailing arms for carrying wheels. A collapsible spring is disposed between the trailing arms and the frame and cushions the swinging movement of the trailing arms. A lever arm is fixedly mounted to at least one of the trailing arms and extends upwardly from the trailing arm. A shock absorber has one end mounted to the frame and another end pivotally mounted to the lever arm above the axis about which the trailing arm pivots. The shock absorber dampens the pivotal movement of the trailing arm.

BRIEF DESCRIPTION OF THE DRAWINGS

The invention will now be described with reference to the drawings wherein.

DESCRIPTION OF THE PREFERRED EMBODIMENT

Figure 1:
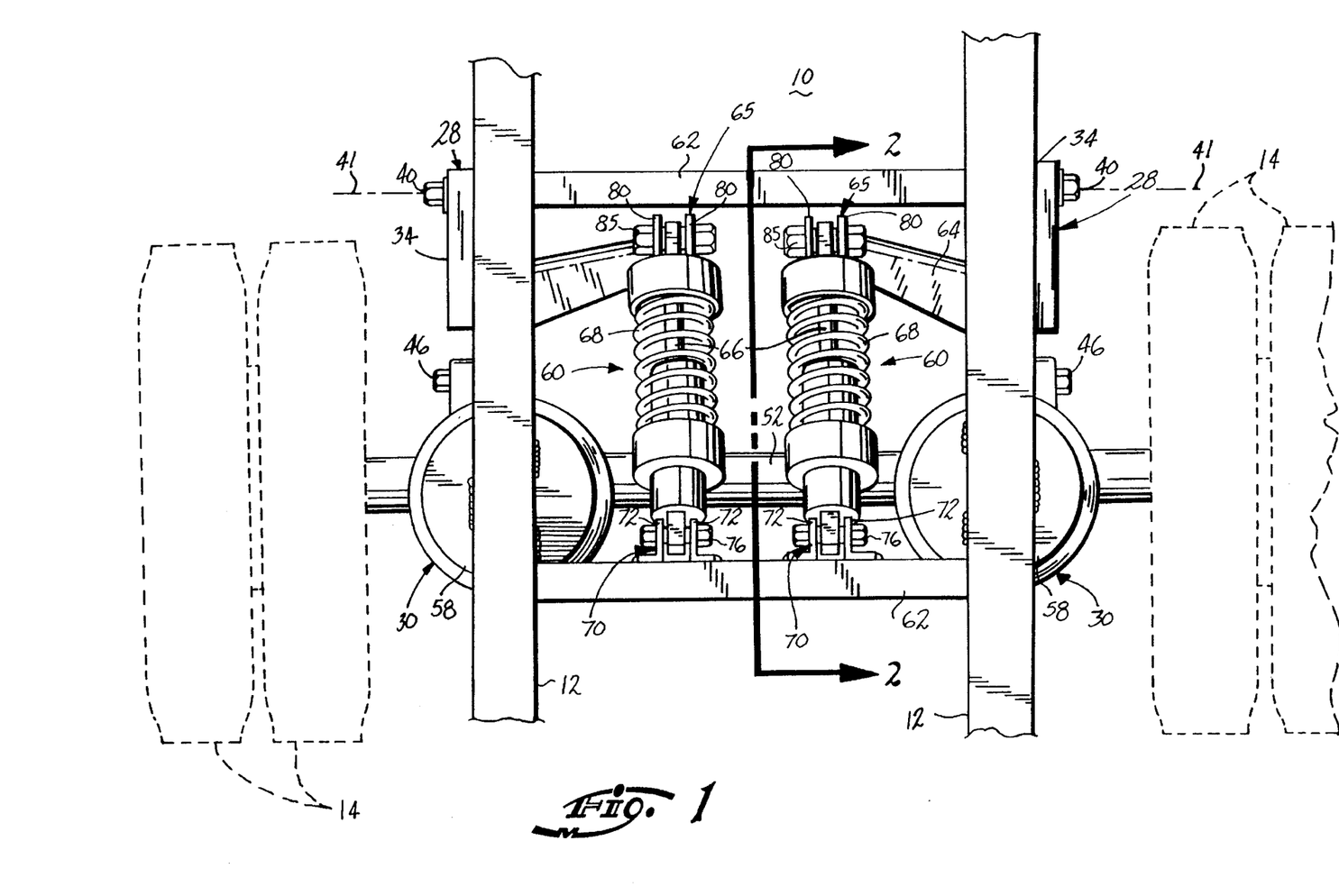
FIG. 1 is a plan view of a trailing arm suspension according to the invention mounted to a trailer-frame with the trailer omitted for clarity.
Figure 2:
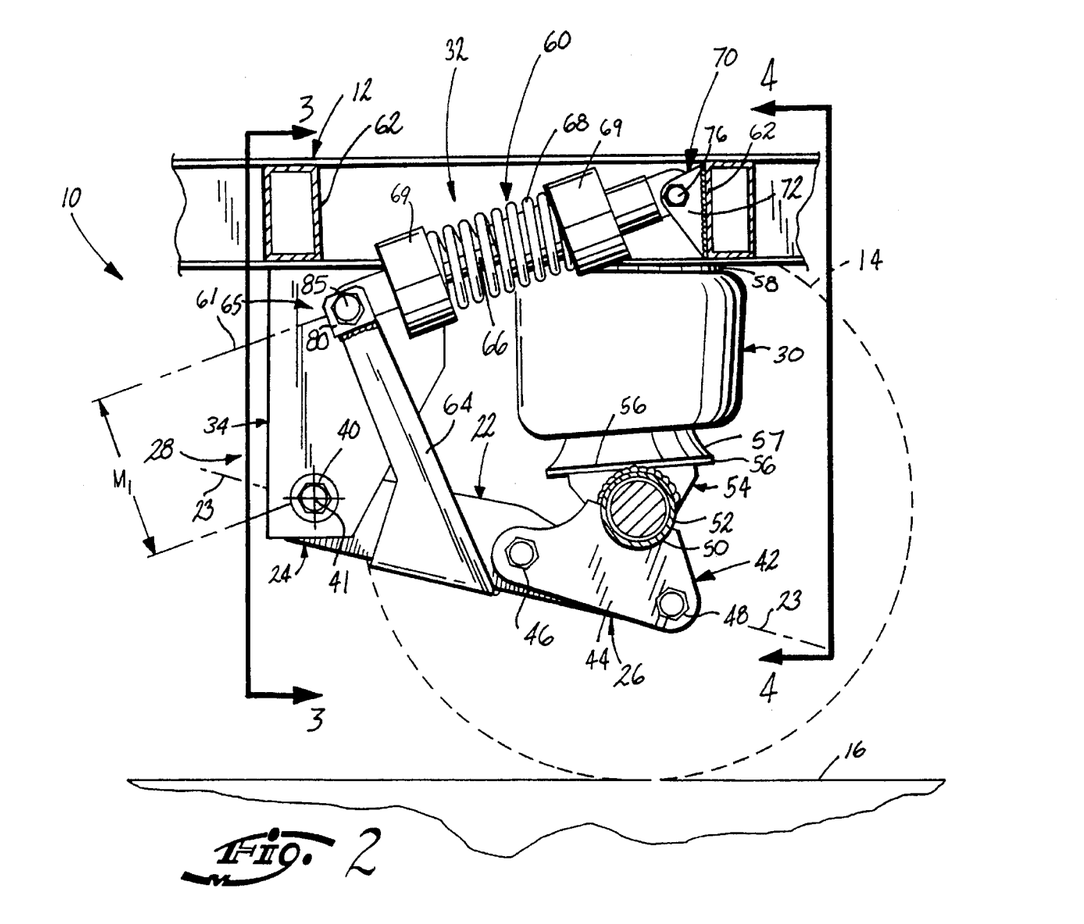
FIG. 2 is an elevational view taken along line 2—2 of FIG. 1 with the suspension illustrated in a normal highway mode.
Figure 5:
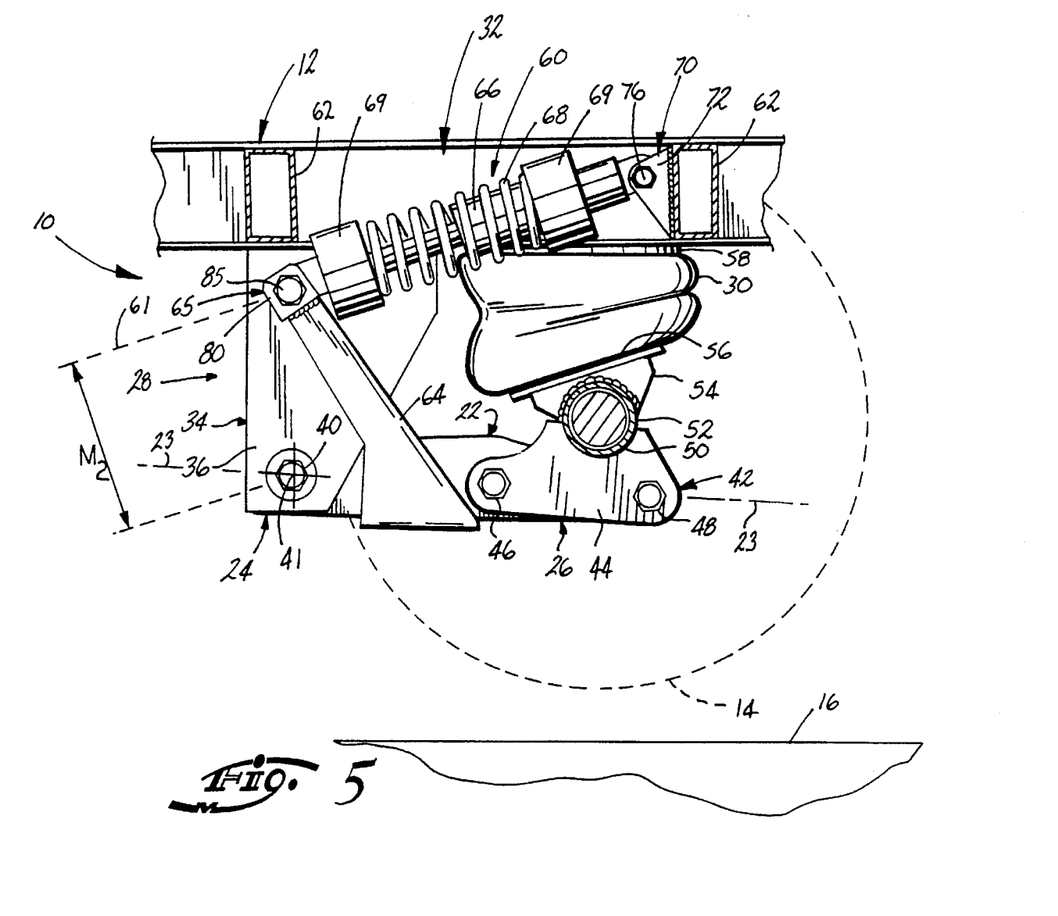
FIG. 5 is an elevational view similar to FIG. 2 with the suspension illustrated in a retracted mode.
Figure 6:
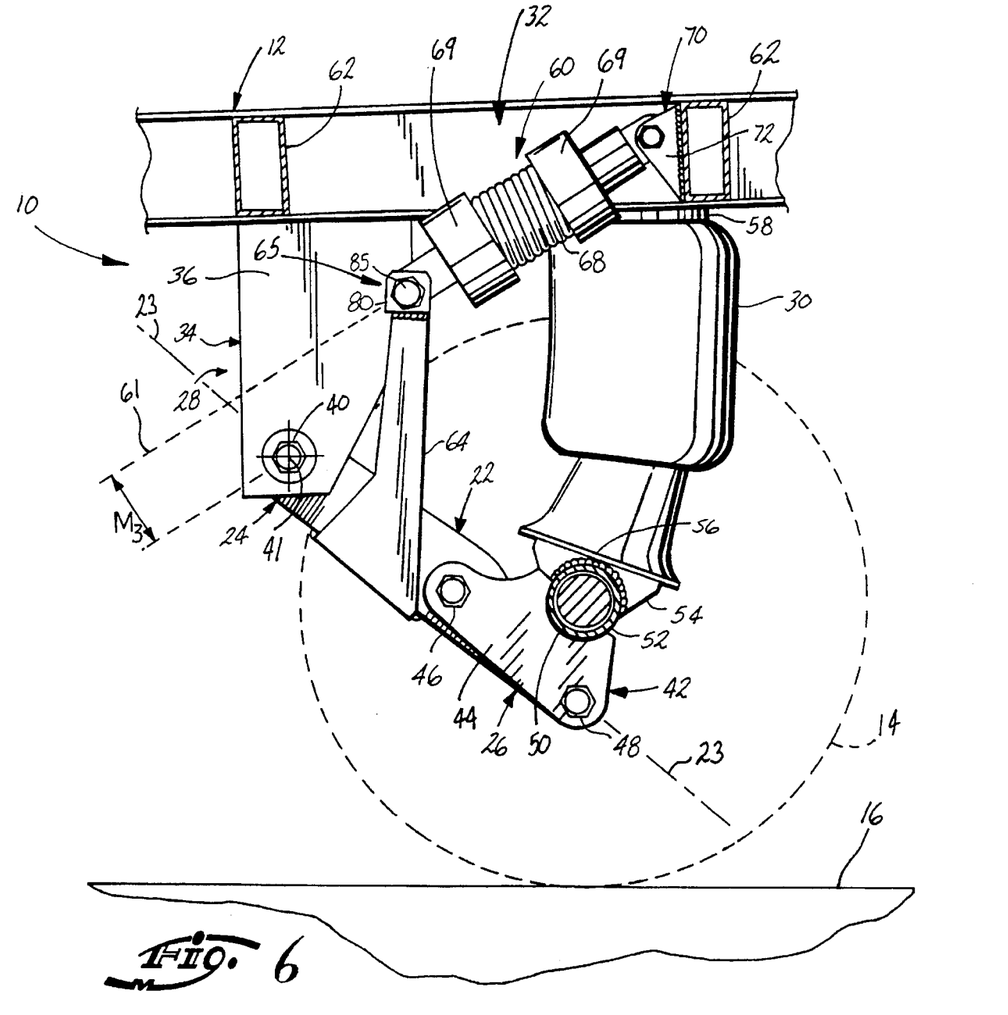
FIG. 6 is an elevational view similar to FIG. 2 with the suspension illustrated in an extended mode.

Referring now to the drawings in general and FIGS. 1 and 2 in particular, there is illustrated a retractable, trailing arm suspension system 10 constructed substantially in accordance with the principles of the invention. The suspension 10 is mounted beneath a frame having opposing frame rails 12 and supports ground engaging wheels 14. FIG. 2 illustrates a normal highway mode of operation where the wheels 14 are in contact with a surface, such as a road surface 16. The suspension 10 is further adapted to be retractable whereby the wheels 14 can be lifted off the road surface 16 as illustrated in FIG. 5 in a retracted mode. Further, the suspension 10 is extendable whereby the frame 12 may be lifted relative to the road surface 16 as shown in FIG. 6 with the suspension in an extended mode.

Figure 7:
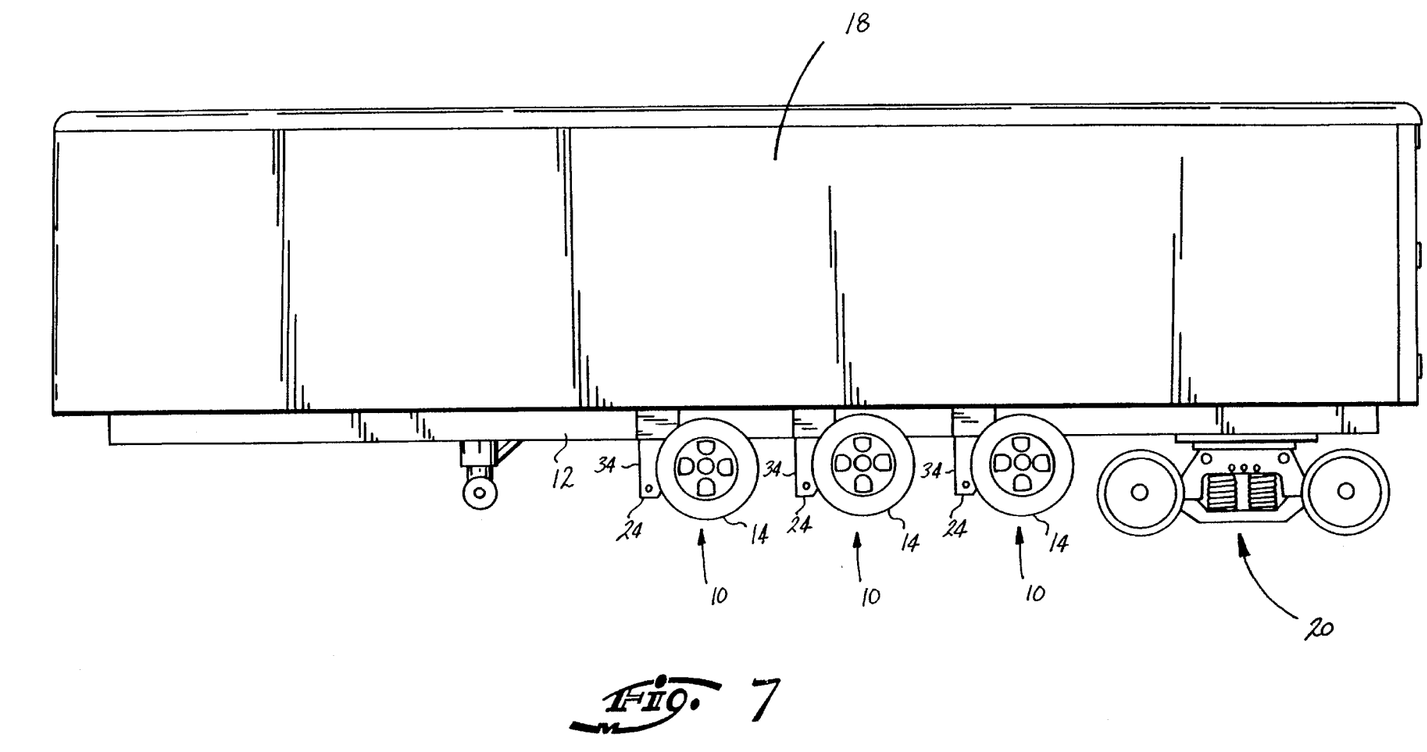
FIG. 7 is an elevational view of a trailer mounted on a rail bogie, and having a tri-axle wheel set incorporating a suspension in accordance with the invention in the retracted position.

Although the suspension 10 supports a single axle having two pair of ground-engaging wheels 14, it will be understood that the preferred construction utilizes a typical tandem axle suspension, or a tridem axle suspension. In any event, a principal function of the retractable suspension 10 is to lift the wheels 14 off the road surface when the wheels are not needed, such as when the load of the vehicle does not warrant the extra support. Alternatively or additionally, the suspension 10 can lift the frame with respect to the road surface 16 for the mounting of a rail bogie 20 (FIG. 7) to permit the utilization of the vehicle on a railway in addition to use on a highway. FIG. 7 illustrates a typical configuration of a tridem trailer 18 having a suspension 10 in the retracted position, and mounted on a rail bogie 20 for railroad use. It will be understood that the rail bogie 20, and detachment mechanisms for securing the trailer to the rail bogie, form no part of this invention, and, in fact, are not necessary for practicing the invention.

The suspension 10 has identical parts that are symmetrical with respect to a longitudinal centerline of the vehicle. For simplicity, only one side of the suspension 10 will be described in detail with it being understood that the description applies equally to the other side of the suspension 10.

Referring more closely to FIGS. 1 and 2, it can be seen that the suspension 10 comprises a trailing arm 22, also sometimes known as a control arm, which has a front end 24 and a rear end 26. The front end 24 is pivotally mounted to a frame bracket assembly 28. A first spring or biasing device, such as an air spring 30, is disposed adjacent the rear end 26 of the trailing arm 22 and cushions the upward and downward movement of the frame 12 with respect to the wheels 14. The force of the air spring 30 is adjustable by adding or exhausting pressurized air from the air spring 30. The air spring 30 can be adjusted to lift the frame with respect to the road surface 16. Although the first biasing device is shown as an air spring 30, it is contemplated that any suitable type of spring can be used. A lifting device 32 serves to retract the trailing arm 22 and thus the suspension 10 relative to the frame 12.

Figure 3:
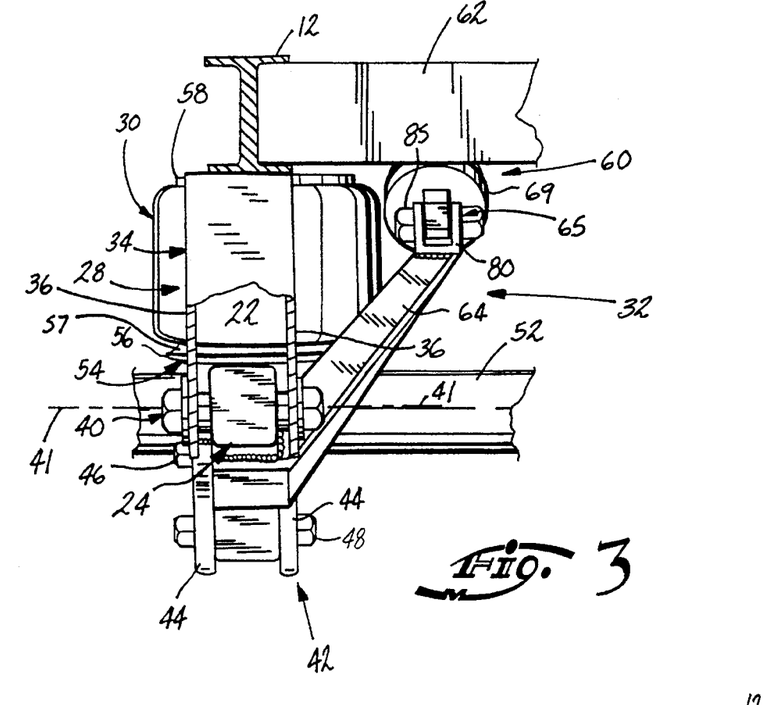
FIG. 3 is an elevational view taken along line 3—3 of FIG. 2.

Referring to FIGS. 2 and 3, the frame bracket assembly 28 comprises a frame bracket 34 that is mounted to the frame rail 12 and to which the front end 24 of the trailing arm 22 is pivotally mounted. The frame bracket 34 has a pair of spaced arms 36 depending from the frame 12. Each arm 36 has an opening (not shown) for accommodating a bushed connection 40 between the trailing arm 22 and the frame bracket 34 in a manner commonly known in the art. The bushed connection 40 defines a pivot axis 41, transversely oriented with respect to the frame, and about which the trailing arm 22 pivots.

Figure 4:
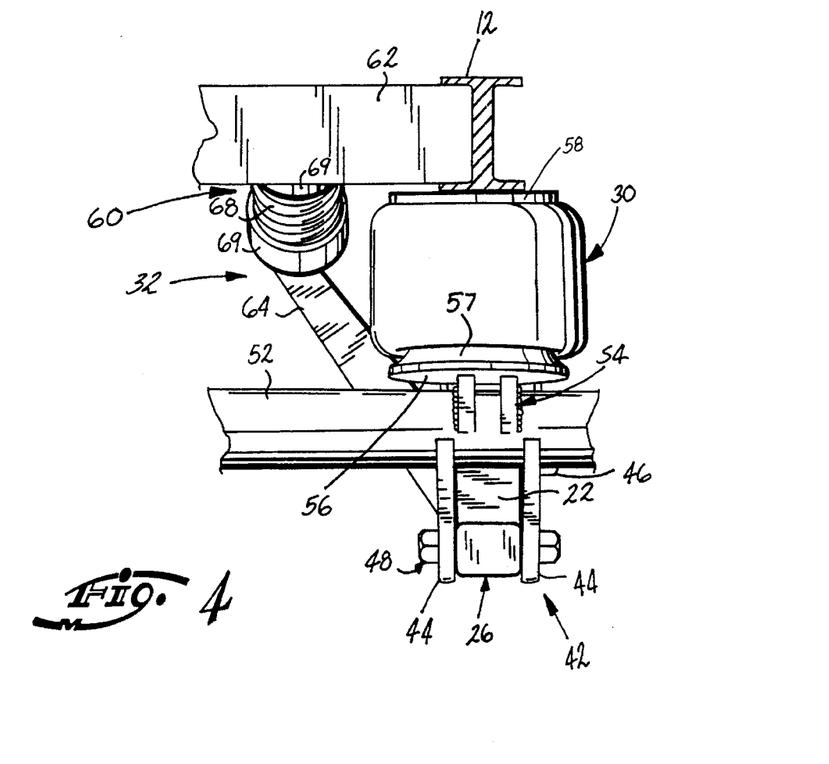
FIG. 4 is an elevational view taken along line 4—4 of FIG. 2.

Referring to FIGS. 2 and 4, an axle bracket 42 is mounted near the rear end 26 of trailing arm 22. The axle bracket 42 comprises opposing side plates 44 that are mounted to the trailing arm 22 by a pair of bushed connections 46 and 48 in a manner well known in the art. An upper portion of the axle bracket 42 comprises a saddle seat to which an axle 52 is rigidly secured as by welding. An air spring support 54 is mounted to the axle 52 and has a platform 56 that supports a piston 57 for the air spring 30. A plate 58, typically welded to the frame rail 12, supports the upper portion of the air spring 30.

Referring now to FIGS. 1–4, the lifting device 32 comprises a lever arm 64 and a second spring or biasing device, such as a biased strut 60. The strut 60 is pivotally connected at one end to a cross member 62 disposed between the frame rails 12 and pivotally connected at the other end to the lever arm 64, which is fixedly connected to the trailing arm 22 as hereinafter described. The strut 60 applies a force on the lever arm 64 to rotate the trailing arm 22 about the pivot axis 41 of the bushed connection 40. The strut 60 preferably comprises a hydraulic or pneumatic cylinder 66, such as a shock absorber, disposed axially within a coil spring 68. The coil spring 68 is compressively retained between opposing end caps 69, one of which is fixed to the casing of the shock absorber 66 and the other of which is fixed to the shaft of the shock absorber 66. The spring 68, being under compression, exerts a force along a longitudinal axis 61 of the strut 60. The axial placement of the shock absorber 66 within the spring restrains the spring 68 from bowing outwardly during compression. The shock absorber 66 also performs its usual function of dampening the movement of the trailing arm 22 during operation of the vehicle. Although the second biasing device is illustrated as a strut 60, it is contemplated that the second biasing device can include any suitable spring.

The preferred embodiment is illustrated with the coil spring 68 coaxially disposed about the shock absorber 66. However, it is to be understood that the coil spring 68 need not be mounted coaxially with the shock absorber 66. It is important only that there be a biasing device mounted directly between the lever arm and the frame. If the biasing device is a coil spring, then a retainer or guide must be used in combination with the coil spring to retain the spring in axial alignment. The shock absorber or similar dampener would then be mounted in a conventional manner directly between the frame and the trailing arm to dampen the movement of the trailing arm with respect to the frame.

One end of the strut 60 is pivotally mounted to the cross member 62 by a bracket 70 having opposing arms 72 with aligned apertures (not shown). The strut 60 has a corresponding aperture (not shown) that is placed between the bracket arms 72 so that it is in alignment with the bracket arm apertures and a fastener 76 extends through the aligned apertures of the shock absorber and the bracket arms. The fastener 76 can be any suitable fastener such as a pin, bolt and nut, etc. The other end of the strut 60 is mounted to the lever arm 64 in a similar manner. The lever arm 64 carries a mounting bracket 80 at an upper end thereof to which the strut 60 is pivotally mounted. The bracket 80 can be yoke-shaped such that the end of the strut 60 is received between the arms of the bracket 80 with aligned apertures of the arms and the strut 60 receiving a fastener 85. (See FIG. 3.)

In the preferred embodiment, the lever arm 64 is welded to the trailing arm 22 between the front and rear ends 24, 26 and extends from the trailing arm 22 upwardly, inwardly and forwardly relative to the vehicle. The strut 60 attaches to a terminal end 65 of the lever arm 64. The terminal end 65 of the lever arm 64 lies at a point roughly in the same plane in which the axis 41 of the bushed connection 40 lies, (the trailing arm pivot axis), which plane is preferably normal to a longitudinal axis 23 of the trailing arm 22. The terminal end 65 also lies upwardly far enough so that in the normal highway mode as shown in FIG. 2 the lever arm 64 is nearly perpendicular to a longitudinal axis 61 of the strut 60. Further, the terminal end 65 is disposed inwardly at a point where the longitudinal axis 61 of the strut 60 will lie in a plane parallel to a vertical plane extending through the frame rail 12. (See FIG. 1.) However, it is contemplated and within the scope of the invention for the trailing arm 22 and the strut 60 to be in alignment to obviate the need for the angular orientation of the lever arm 64. For example, the trailing arm 22 could have an inward curve to position the trailing arm 22 under the strut 60 or the strut 60 could be moved above the trailing arm 22 depending on the geometry of the vehicle suspension. Also, if there is sufficient space, the trailing arm 22 and lever arm 64 can be positioned directly below the frame rail 12.

The lever arm 64 can be positioned in any suitable location on the trailing arm 22, preferably at a position where a moment arm between the line of force for the strut 60, axis 61, and the pivot axis 41 of the bushed connection 40 increases as the wheels 14 are retracted and decreases as the wheels 14 are extended. The moment arm is denoted as $M_1$ when the suspension 10 is in the highway mode (FIG. 2), $M_2$ when the suspension is in the retracted mode (FIG. 5), and $M_3$ when the suspension 10 is in the extended mode (FIG. 6). In the preferred embodiment, the ratio of $M_3$ to $M_2$ is approximately 1:3 so that the moment in the retracted mode is greater than in the extended mode to ensure that the wheels will be raised even though the force of spring 68 is less in the retracted mode than in the extended mode because the spring 68 is less compressed.

Figure 8:
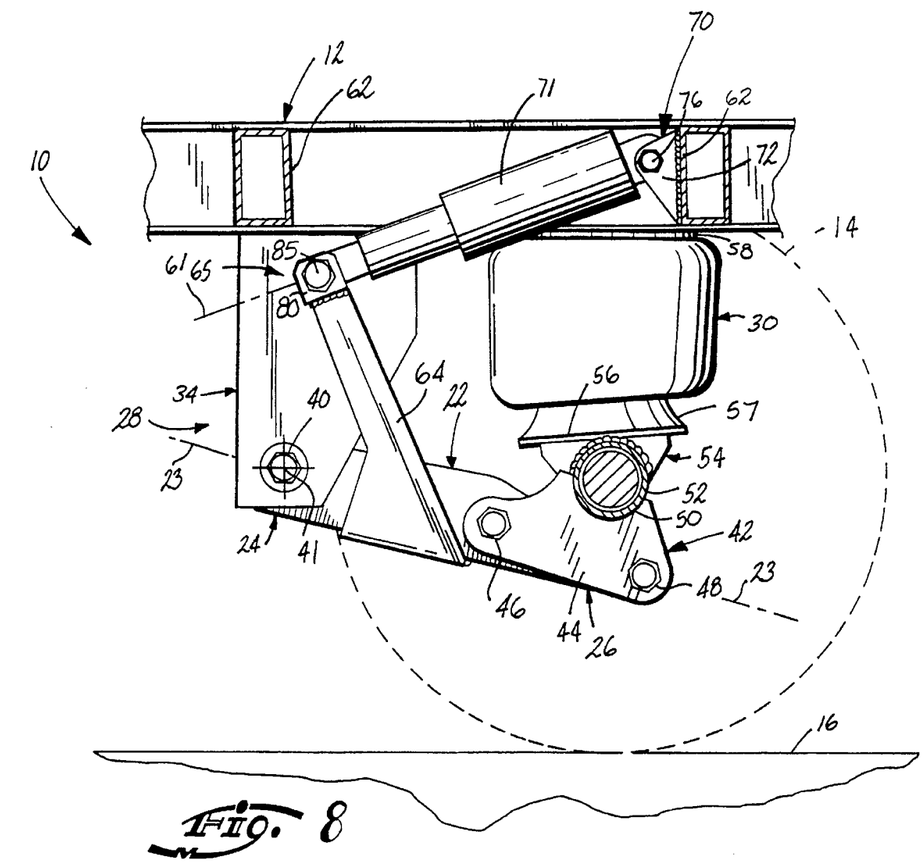
FIG. 8 is an elevational view substantially similar to FIG. 2, of an alternative embodiment of a trailing arm suspension according to the invention.

Referring to FIG. 8, the lever arm 64 can be connected to the frame by a shock absorber 71 instead of a strut 60. With the shock absorber 71, the lever arm 64 serves as a mounting bracket for the shock absorber 71, which functions in its traditional manner as a dampener for the loads imparted to the suspension from the contact of the wheel 14 with the road surface 16. The following description of the operation of the suspension 10 is equally applicable whether or not the strut 60 or the shock absorber 71 is used.

Referring now to FIG. 2 for operation of the suspension, the strut 60 exerts a force that is applied to the lever arm 64 along the longitudinal axis 61 of the strut 60. This force results in a moment being applied to the trailing arm 22 about the axis 41 of the bushed connection 40 that tends to rotate the trailing arm 22 counterclockwise as viewed in FIGS. 2, 5 and 6 about the bushed connection 40 and upward toward the frame rail 12. Thus, the strut 60 is always urging the wheel 14 upwardly. The force of the strut 60 is counterbalanced by the force of the air spring 30, which, when pressurized, acts on the end of the trailing arm 22, resulting in a moment opposite the moment associated with moment arm $M_1$. In addition, the weight of axle assembly 52 and wheels 14 which is typically about 1700 lbs., creates a moment about the bushed connection 40 that is opposite the moment associated with moment arm $M_1$.

Thus, for the wheel 14 to be raised, the strut 60 must generate sufficient force so that the moment associated with moment arm $M_1$ is greater than the combined opposite moment created by the air spring 30 and the weight of part of the suspension 10 comprising the axle assembly 52 and wheels 14. Advantageously, the force of the air spring 30 can be adjusted and even reduced to zero by exhausting the air from the air spring 30. Therefore, the strut 60 need only to create a moment associated with moment arm $M_1$ great enough to overcome the moment created by the weight of part of the suspension 10 comprising the axle assembly 52 and wheels 14 to fully retract the wheel 14 if the air spring 30 is exhausted of air.

The air spring 30 is typically pressurized to approximately 90 psig in the normal highway mode shown in FIG. 2. Also, in the highway mode, the strut 60 of the preferred embodiment exerts a force of approximately 3,000 lbs. such that the length of the moment arm $M_1$ is approximately 10 inches in generally steady state where the combined force of the air spring 30 and the trailing arm weight roughly equal and counterbalance the force of the strut 60.

To raise the wheels 14 or retract the suspension 10, air is exhausted from the air springs 30 so that the moment associated with moment arm $M_1$ will overcome the combined force in the air springs 30 and the weight of the suspension system 10 and axle assembly 52 and wheels 14. The unbalanced forces will start rotating the trailing arm 22 about the pivot axis 41 of the bushed connection 40 and raise the wheels 14. Preferably, the air will be completely exhausted. As the trailing arm 22 rotates, the force of the strut 60 decreases, but the moment arm defined between the line of force of the strut 60 and the pivot axis 41 increases until the suspension 10 is in the fully retracted mode.

When the suspension system 10 is in the fully retracted mode, the strut 60 will typically exert approximately 2,000 lbs. of force and the moment arm $M_2$ is approximately 12 inches. The resulting moment is sufficient to overcome the opposing moment of the air bags 30, if any, and the weight of the suspension system 10 and axle assembly 52 and wheels 14. However, the strut 60 exerts less force as it is expanded. Thus, the moment arm must increase as the spring 68 expands so that the moment does not fall below that needed to keep the suspension retracted. The decrease in the force of the springs is more than countered by the increase in the moment arm, resulting in a moment that is greater when the wheels are in the retracted position than in any other position. Thus, the lever arm 64 compensates for the reduction in the force of the strut 60 as the spring 68 expands from a compressed state (FIG. 2, highway mode) to a less compressed state (FIG. 5, retracted mode). The geometry of the lever arm 64 further reduces the size of the spring 68 required in the strut 60 to retract the wheels 14 and securely retain the wheels 14 in the retracted position without the need for a separate locking device.

If the vehicle frame 12 needs to be raised such as, for example, if a rail bogie 20 (FIG. 7) is to be installed under the vehicle frame, force must be applied to the trailing arm 22 against the moment arm $M_1$. This is accomplished by pressurizing the air spring 30 a sufficient amount to raise the frame with respect to the wheels 14 to the extended position as illustrated in FIG. 6. Preferably, each air spring 30 will be pressurized to approximately 120 psig to move the frame to the raised position. In the raised position, the spring 68 of the strut 60 is almost fully compressed and exerts approximately 4,400 lbs of force. The moment arm $M_3$, on the other hand, is approximately 4 inches. It will be apparent that because of the position of the lever arm 64, the change in length of the moment arm is not linearly proportional to the change in force of the strut 60. Thus, the pressurized air spring 30 is sufficient to overcome the moment, even with the increased force of the strut 60.

After the frame rails 12 are raised by pressurizing the air springs 30 to overcome the force of the strut 60, a rail bogie 20 can be positioned beneath the frame rails 12 and the frame lowered thereon by exhausting pressurized air from the air springs 30 until the frame contacts the rail bogie 20. The rail bogie 20 is secured to the frame in a manner commonly known in the art.

Whereas the invention has been described with reference to a compression spring between the frame 12 and the lever arm 64, it is also within the scope of the invention to substitute a fluid cylinder or other type of force applying element for the compression spring 68. The fluid cylinder can be pressurized at the same time that the air is exhausted from the air spring 30 to raise the trailing arms 22 to the retracted position illustrated in FIG. 5. The fluid cylinder can be deactivated to act as a shock absorber at times when the trailing arm is in the road engaging position.

Another form of a force applying element is an air spring which can be selectively activated to raise the trailing arm to the retracted position. Thus, an air spring can be used in lieu of the compression spring 68.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure without departing from the spirit of the invention.

The embodiments of the invention in which an exclusive property or privilege is claimed are defined as follows:

1. In a suspension for a vehicle comprising a frame, the suspension including a pair of trailing arms pivotally mounted to the frame for vertical swinging movement relative thereto about a transverse axis between at least a retracted position and a road engaging position, an axle mounted to and between the trailing arms for carrying wheels for contact with a road surface, and a selectably variable force spring between the trailing arms and the frame for cushioning the swinging movement of the trailing arms in the road engaging position, the improvement comprising:

a lever arm fixedly mounted to at least one trailing arm and extending upwardly therefrom, the lever arm being positioned to define a moment arm relative to the transverse axis that increases as the at least one trailing arm is moved toward the retracted position, and a compression spring mounted between the frame and the lever arm above the transverse trailing arm axis to bias the at least one trailing arm to the retracted position, whereby the force of the compression spring exerted on the lever arm tends to raise the at least one trailing arm to the retracted position when the force on the variable force spring is reduced.

2. A suspension for a vehicle according to claim 1 wherein the variable force spring is an air spring.

3. A suspension for a vehicle according to claim 1 wherein the compression spring comprises a coil spring.

4. A suspension for a vehicle according to claim 3 and further comprising a dampening member mounted between the frame and the lever arm above the transverse trailing arm axis to dampen the swinging movement of the at least one trailing arm.

5. A suspension for a vehicle according to claim 4 wherein the dampening member is a shock absorber.

6. A suspension for a vehicle according to claim 4 wherein the dampening member is mounted coaxially with the spring.

7. A suspension for a vehicle according to claim 3 wherein the variable force spring is an air spring.

8. A suspension for a vehicle according to claim 1 and further comprising a dampening member mounted between the frame and the at least one trailing arm to dampen the swinging movement of the at least one trailing arm.

9. A suspension for a vehicle according to claim 1 wherein the at least one trailing arm has first and second ends and the lever arm is fixedly mounted to the at least one trailing arm between the first and second ends.

10. A suspension for a vehicle according to claim 9 wherein the lever arm has a terminal end which is disposed above the at least one trailing arm.

11. A suspension for a vehicle according to claim 10 wherein the compression spring is pivotally mounted at one end to the frame and at another end to the terminal end of the lever arm.

12. A suspension for a vehicle according to claim 11 wherein the variable force spring is mounted between the at least one trailing arm and the frame near the second end of the at least one trailing arm.

13. A suspension for a vehicle according to claim 12 wherein the frame further comprises opposed frame rails connected by a cross member and the compression spring is pivotally mounted at one end to the cross member.

14. A suspension for a vehicle according to claim 1 wherein the compression spring is pivotally mounted at one end to the frame and pivotably mounted at another end to the lever arm.

15. A suspension for a vehicle according to claim 1 wherein the at least one trailing arm pivots between the retracted position and an extended position where the frame is raised relative to the surface by the variable force spring, and the ratio of the moment arm in the retracted position to the moment arm in the extended position is greater than one-to-one.

16. A suspension for a vehicle according to claim 15 wherein the ratio of the moment arm in the retracted position to the moment arm in the extended position is three-to-one.

17. In a suspension for a vehicle comprising a frame, the suspension including a pair of trailing arms pivotally mounted to the frame for vertical swinging movement relative thereto about a transverse axis between at least a retracted position and a road engaging position, an axle rigidly mounted to and between the trailing arms for carrying wheels for contact with a road surface, and at least one selectably variable force spring between the trailing arms and the frame for cushioning the swinging movement of the trailing arms in the road engaging position, the improvement comprising:

a lever arm fixedly mounted to at least one trailing arm and extending upwardly therefrom, the lever arm being positioned to define a moment arm relative to the transverse axis that increases as the at least one trailing arm is moved to the retracted position; and a force generating member mounted between the frame and the lever arm above the transverse axis to urge the at least one trailing arm toward the retracted position when the force on the variable force spring is reduced;

whereby the at least one trailing arm is in the road engaging position when the variable force spring is at a predetermined force level and the at least one trailing arm will automatically move toward the retracted position when the force of the variable force spring is reduced from the predetermined force level.

18. In a suspension for a vehicle comprising a frame, the suspension including a pair of trailing arms pivotally mounted to the frame for vertical swinging movement relative thereto about an axis between at least a retracted position and a road engaging position, an axle rigidly mounted to and between the trailing arms for carrying wheels, and a spring between the trailing arms and the frame for cushioning the swinging movement of the trailing arms, the improvement comprising:

a lever arm fixedly mounted to at least one trailing arm and extending upwardly therefrom, the lever arm being positioned to define a moment arm about the axis that increases as the at least one trailing arm is moved toward the lo retracted position; and a dampening member having one end mounted to the frame and another end mounted to the lever arm above the axis;

whereby the dampening force from the dampening member on the at least one trailing arm increases as .the at least one trailing arm is retracted to variably dampen the swinging movement of the at least one trailing arm.

19. A suspension for a vehicle according to claim 18 wherein the dampening member is a shock absorber.

20. A suspension for a vehicle according to claim 18 wherein the spring is an air spring.

21. A suspension for a vehicle according to claim 18 wherein the at least one trailing arm has a first and second end and the lever arm is fixedly mounted to the at least one trailing arm between the first and second ends.

22. A suspension for a vehicle according to claim 21 wherein the lever arm has a terminal end, which is disposed above the at least one trailing arm.

23. A suspension for a vehicle according to claim 22 wherein the dampening member is pivotally mounted to the frame and the terminal end of the lever arm.

24. A suspension for a vehicle according to claim 23 wherein the spring is mounted between the at least one trailing arm and the frame near the second end of the at least one trailing arm.

25. A suspension for a vehicle according to claim 24 wherein the frame further comprises opposed frame rails connected by a cross member and the dampening member is pivotally mounted to the cross member.

* * * * *